US011015663B2

(12) United States Patent
Shan et al.

(10) Patent No.: US 11,015,663 B2
(45) Date of Patent: May 25, 2021

(54) LIFTING DEVICE

(71) Applicant: Xuzhou Heavy Machinery Co., Ltd., Xuhou (CN)

(72) Inventors: Zenghai Shan, Xuzhou (CN); Lifeng Cao, Xuzhou (CN); Yanan Sun, Xuzhou (CN); Guangzhi Cao, Xuzhou (CN); Quansheng Huang, Xuzhou (CN); Qiang Song, Xuzhou (CN); Wenlong Yang, Xuzhou (CN)

(73) Assignee: XUZHOU HEAVY MACHINERY CO., LTD., Xuhou (CN)

( * ) Notice: Subject to any disclaimer, the term of this patent is extended or adjusted under 35 U.S.C. 154(b) by 82 days.

(21) Appl. No.: 16/447,377

(22) Filed: Jun. 20, 2019

(65) Prior Publication Data
US 2020/0124117 A1  Apr. 23, 2020

(30) Foreign Application Priority Data

Oct. 22, 2018 (CN) .......................... 201811226074.1

(51) Int. Cl.
*B66C 23/00* (2006.01)
*F16D 43/20* (2006.01)
*B66F 9/065* (2006.01)

(52) U.S. Cl.
CPC ............ *F16D 43/20* (2013.01); *B66F 9/0655* (2013.01); *F16D 2500/50287* (2013.01)

(58) Field of Classification Search
CPC ......... B66C 13/12; B66C 13/16; B66C 23/66; B66C 23/68; B66C 23/703; B66C 23/705; B66C 23/905; B66F 9/0655
See application file for complete search history.

(56) References Cited

U.S. PATENT DOCUMENTS 4,063,649 A * 12/1977 Hubbard ............... B66C 23/905
                                                    212/278
4,178,591 A * 12/1979 Geppert ............... B66C 23/905
                                                    212/278

(Continued)

FOREIGN PATENT DOCUMENTS

CN    201165454    12/2008
CN    201201869    3/2009

(Continued)

*Primary Examiner* — Emmanuel M Marcelo
(74) *Attorney, Agent, or Firm* — Myers Bigel, P.A.

(57) ABSTRACT

The present disclosure provides a lifting device comprising: a telescopic boom, comprising a basic section, at least one primary telescopic section and at least one secondary telescopic section; a telescopic control mechanism, comprising a primary telescopic drive mechanism that controls synchronous telescoping of the at least one primary telescopic section and a secondary telescopic drive mechanism that controls synchronous telescoping of the at least one secondary telescopic section; a torque limiter, comprising a first length sensor and a second length sensor, wherein a first sensor body and a telescopic end of a first length measuring cable of the first length sensor are respectively connected to tails of adjacent two section in the basic section and the at least one primary telescopic section; and a second sensor body and a telescopic end of a second length measuring cable of the second length sensor are respectively connected to tails of adjacent two section in the primary telescopic section adjacent to the at least one secondary telescopic section and the at least one secondary telescopic section. The lifting device of the present disclosure can reduce the length of the length measuring cable of a length sensor and thus reduce its volume and weight.

14 Claims, 2 Drawing Sheets

(56) References Cited

U.S. PATENT DOCUMENTS

| | | | | |
|---|---|---|---|---|
| 4,456,093 A | * | 6/1984 | Finley | B66F 17/006 |
| | | | | 182/18 |
| 5,160,055 A | * | 11/1992 | Gray | B66C 23/90 |
| | | | | 212/278 |
| 5,731,987 A | * | 3/1998 | Strong | B66C 23/905 |
| | | | | 700/302 |
| 8,352,129 B2 | * | 1/2013 | Yuan | B66C 13/06 |
| | | | | 701/50 |
| 2003/0082041 A1 | * | 5/2003 | Barney | B66F 17/003 |
| | | | | 414/685 |
| 2015/0144583 A1 | * | 5/2015 | Matsumoto | B66C 23/705 |
| | | | | 212/276 |

FOREIGN PATENT DOCUMENTS

| | | |
|---|---|---|
| CN | 201506691 | 6/2010 |
| CN | 202030456 | 11/2011 |
| CN | 104555736 | 4/2015 |
| CN | 204897339 | 12/2015 |
| CN | 108298429 | 7/2018 |

* cited by examiner

LIFTING DEVICE

RELATED APPLICATION

The present application claims priority from Chinese application number CN201811226074.1 filed Oct. 22, 2018, which is herein incorporated by reference.

FIELD OF THE INVENTION

The present disclosure relates to the technical field of lifting, and in particular to a lifting device.

BACKGROUND OF THE INVENTION

The boom which is a core member of the lifting device, is the most important load-bearing structural member for the lifting operation of the lifting device. In the prior art, the telescopic boom realizes a telescopic action by mainly depending on a telescopic control mechanism of a rope arrangement type or a telescopic control mechanism of a single cylinder bolt type. In order to ensure the lifting safety, the lifting device is also provided with a torque limiter to prevent the boom from being overloaded.

The telescopic control mechanism of a row arrangement type is generally used for a boom having five or less sections, and the telescopic cylinder and the thick and thin cables cooperate to realize the extension and retraction actions of the boom. The telescopic control mechanism of a row arrangement type is divided into a single cylinder telescopic control mechanism of a row arrangement type and a double cylinder telescopic control mechanism of a row arrangement type. The single cylinder telescopic control mechanism of a row arrangement type controls the telescoping of the second section by means of the telescopic cylinder, and controls the synchronous telescoping of the third section and the fourth and more sections (if any, for example, the fourth section and the fifth section) by means of the rope arrangement mechanism in linkage with the telescopic cylinder. The double cylinder telescopic control mechanism of a rope arrangement type controls the telescoping of the second section by means of the primary telescopic cylinder, controls the telescoping of the third section by means of the secondary telescopic cylinder, and controls the synchronous telescoping of the fourth section and the fifth and more sections (if any, for example, a fifth section) by means of the rope arrangement mechanism in linkage with the secondary telescopic cylinder.

The torque limiter which is a safety protection device for the lifting device, mainly comprises a torque limiter main controller, a display, a length measuring device (comprising a length sensor), an angle sensor, an oil pressure sensor, a height stopper, and the like. When the actual torque of the boom is close to an overload, the torque limiter sends out audible or visual alarms, and automatically stops a dangerous action before the overload.

The telescopic boom of the lifting device having a double cylinder telescopic control mechanism of a row arrangement type is generally in such a telescopic manner as a sequential telescopic manner, and the length measuring device of the torque limiter comprises length measuring cables of a first length sensor and a second length sensor. Due to the limitation of the internal space of the telescopic boom, the length measuring device of the lifting device having a double cylinder telescopic control mechanism of a row arrangement type is disposed outside the telescopic boom.

FIG. 1 is a schematic structural view of a telescopic boom of the lifting device having a double cylinder telescopic control mechanism of a row arrangement type as well as a length measuring device of the torque limiter in the prior art.

As shown in FIG. 1, the telescopic boom comprises five sections, which comprise a basic section A (i.e. a first section), a second section B, a third section C, a fourth section D and a fifth section E (i.e. an terminal section of the telescopic boom).

The length measuring device of the torque limiter comprises a first length sensor 1 and a second length sensor 2. The first length sensor 1 comprises a first sensor body and a first length measuring cable that is telescopic relative to the first sensor body. The second length sensor 1 comprises a second sensor body and a second length measuring cable that is telescopic relative to the second sensor body. The extension length of the corresponding portion of the boom may be obtained by measuring the extension length of the length measuring cable by the measuring member of the length sensor body. The first length sensor 1 is used to detect the total extension length of the telescopic boom. The first sensor body is mounted on the basic section A, and the telescopic end of the first length measuring cable is mounted on a stay holder of the head of the fifth section E. The second length sensor 2 is used to detect the extension length of the second section B to judge a telescopic state of the second section B. The second sensor body is disposed at the head of the basic section A, and the telescopic end of the second length measuring cable is connected to the head of the second section B.

In the above prior art, the first sensor body and the second sensor body are both mounted on the basic section A, and the first length measuring cable is guided by a pulley of the basic section A and pulleys of the heads of the remaining respective sections, finally with its telescopic end fixed at the head of the fifth section E. The length of the first length measuring cable is at least a sum of the maximum extension lengths of the second section B, the third section C, the fourth section D and the fifth section E and the distance from the corresponding first sensor body to the head of the basic section A. The first length measuring cable has a long length so that it is necessary that the first length sensor has a large volume and a heavy weight. In addition, the length measuring device is disposed outside the boom which has certain limitations during use. In the transfer and operation process of the lifting device, the foreign objects such as branches and electric poles at a higher position are prone to scratch the exposed length measuring cable, to cause damage to the length measuring cable, which results in that the length signal of the boom cannot be transmitted to the torque limiter main controller, so that the normal lifting operation of the lifting device is affected.

SUMMARY OF THE INVENTION

It is an object of the present disclosure to provide a lifting device.

The lifting device comprises: a telescopic boom, comprising a basic section, at least one primary telescopic section telescopically disposed within the basic section, and at least one secondary telescopic section telescopically disposed within the at least one primary telescopic section; a telescopic control mechanism for manipulating telescoping of the telescopic boom, disposed within the telescopic boom, and comprising a primary telescopic drive mechanism for manipulating synchronous telescoping of the at least one primary telescopic section and a secondary telescopic drive mechanism for manipulating synchronous telescoping of the at least one secondary telescopic section; a torque limiter, comprising a length measuring device, the length measuring device comprising a first length sensor and a second length sensor; the first length sensor comprises a first sensor body and a first length measuring cable telescopic relative to the first sensor body, wherein the first sensor body and a telescopic end of the first length measuring cable are respectively connected to tails of adjacent two sections in the basic section and the at least one primary telescopic section to obtain a first length signal representative of an extension length of one primary telescopic section; the second length sensor comprises a second sensor body and a second length measuring cable telescopic relative to the second sensor body, and the second sensor body and a telescopic end of the second length measuring cable are respectively connected to tails of adjacent two sections in one primary telescopic section adjacent to the at least one secondary telescopic section and the at least one secondary telescopic section to obtain a second length signal representative of an extension length of one secondary telescopic section.

In some embodiments, the first length measuring cable is provided inside the telescopic boom; and/or, the second length sensor is provided inside the telescopic boom.

In some embodiments, the first sensor body is provided on the basic section and located outside the basic section, and a telescopic end of the first length measuring cable is passed through the basic section and connected to a tail of a primary telescopic section adjacent to the basic section; or the first sensor body is provided on the basic section and located inside the basic section, and a telescopic end of the first length measuring cable is connected to a tail of a primary telescopic section adjacent to the basic section.

In some embodiments, the first sensor body is disposed outside the basic section and below a tail of the basic section, wherein a bottom of a tail of the basic section is recessed upwards relative to a barrel of the basic section.

In some embodiments, the second length measuring cable is a steel wire rope.

In some embodiments, the telescopic end of the first length measuring cable is connected to a signal output end of the second length sensor, for transferring the second length signal obtained by the second length sensor to the first length sensor.

In some embodiments, the torque limiter further comprises a torque limiter main controller; the length measuring device further comprises a length signal transmission cable connected between the first length sensor and the torque limiter main controller, for transferring the first length signal and the second length signal to the torque limiter main controller.

In some embodiments, the first sensor body and the second sensor body are respectively mounted at tails of adjacent sections.

In some embodiments, the at least one primary telescopic section comprises a second section, and the primary telescopic drive mechanism is configured to manipulate telescoping of the second section relative to the basic section, and the first sensor body and the telescopic end of the first length measuring cable are respectively connected to the tail of the basic section and the tail of the second section; the at least one secondary telescopic section comprises a third section, and the secondary telescopic drive mechanism is configured to manipulate telescoping of the third section relative to the second section, and the second sensor body and the telescopic end of the second length measuring cable are respectively connected to the tail of the second section and the tail of the third section.

In some embodiments, the primary telescopic drive mechanism comprises a primary telescopic cylinder that manipulates telescoping of the second section relative to the basic section, and the secondary telescopic drive mechanism comprises a secondary telescopic cylinder that manipulates telescoping of the third section relative to the second section and a rope arrangement mechanism in linkage with the secondary telescopic cylinder; the at least one secondary telescopic section further comprises at least one linkage section telescopically disposed within the third section, the rope arrangement mechanism manipulating synchronous telescoping of the at least one linkage arm relative to the third section.

In some embodiments, the lifting device comprises a first stay holder, by means of which the telescopic end of the first length measuring cable is detachably mounted at a tail of a corresponding section; and/or the lifting device comprises a second stay holder, by means of which the telescopic end of the second length measuring cable is detachably mounted at a tail of a corresponding section.

In some embodiments, the telescopic boom has at least one opening, at least a part of constituent components of the length measuring device entering into or leaving from the boom through the at least one opening.

In some embodiments, the at least one opening comprises a first opening disposed rearward of the basic section.

In some embodiments, the at least one opening comprises: a second opening disposed lateral to the tail of the basic section; and a third opening disposed lateral to the tail of the primary telescopic section adjacent to the basic section, wherein the second opening and the third opening are configured to at least partially overlap in a telescopic process of the telescopic boom.

Based on the lifting device provided by the present disclosure, the two length sensors thereof only need to respectively measure the extension length of one telescopic section relative to an adjacent section, so as to be able to obtain the total extension length of the same telescopic section according to the obtained length signal and the structural parameters of the boom, to further obtain the total extension length of the telescopic boom. Compared with the prior art, the length of the length measuring cable of one length sensor of the length measuring device is effectively shortened, so that it is possible to reduce the volume and weight of the corresponding length sensor.

Other features and advantages of the present disclosure will become apparent from the following detailed description of exemplary embodiments of the present disclosure with reference to the accompanying drawings.

BRIEF DESCRIPTION OF THE ACCOMPANYING DRAWINGS

The drawings described herein are used to provide a further understanding of the present disclosure and constitute a part of the present application. The illustrative embodiments of the present disclosure as well as the descriptions thereof, which are used for explaining the present disclosure, do not constitute improper definitions on the present disclosure. In the drawings.

DETAILED DESCRIPTION OF THE PREFERRED EMBODIMENTS

Figure 1:
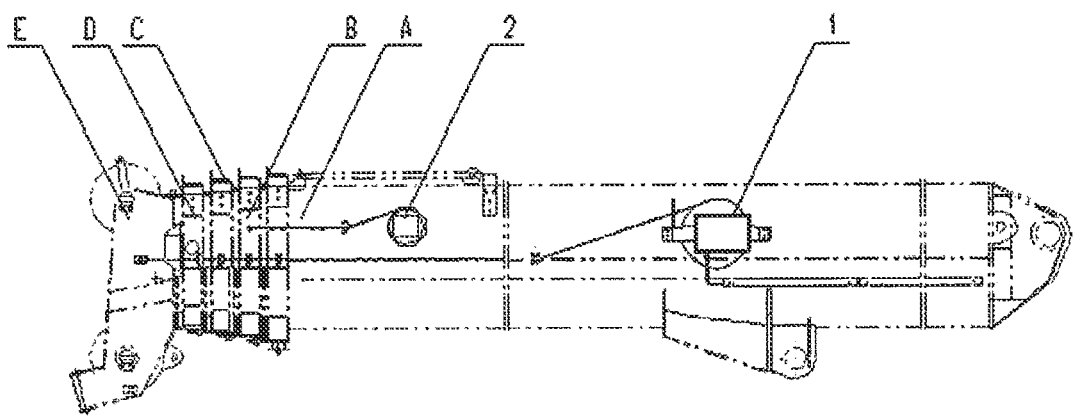
FIG. 1 is a schematic structural view of a telescopic boom of the lifting device having a double cylinder telescopic control mechanism of a row arrangement type as well as a length measuring device of the torque limiter in the prior art.

Next, the technical solution in the embodiments of the present disclosure will be explicitly and completely described in combination with the drawings in the embodiments of the present disclosure. Apparently, the described embodiments are merely part of the embodiments of the present disclosure, rather than all the embodiments. The following descriptions of at least one exemplary embodiment which are in fact merely descriptive, by no means serve as any delimitation on the present disclosure as well as its application or use. On the basis of the embodiments of the present disclosure, all the other embodiments acquired by a person skilled in the art on the premise that no inventive effort is involved fall into the scope protected by the present disclosure.

Unless additionally specified, the relative arrangements of the components and steps expounded, numerical expressions and numerical values in these examples do not limit the scope of the present invention. At the same time, it should be understood that, in order to facilitate the description, the dimensions of various parts shown in the drawings are not delineated according to actual proportional relations. The techniques, methods, and apparatuses known to a common technical person in the relevant art may not be discussed in detail, but where appropriate, techniques, methods, and apparatuses should be considered as part of the granted description. Among all the examples shown and discussed here, any specific value should be construed as being merely illustrative, rather than as a delimitation. Thus, other examples of exemplary embodiments may have different values. It should be noted that similar reference signs and letters present similar items in the following drawings, and therefore, once an item is defined in a drawing, there is no need for further discussion in the subsequent drawings.

In the description of the present disclosure, it is necessary to understand that, such wordings as "first" and "second" which are used to define the parts, are only intended to facilitate distinguishing the corresponding parts. Unless otherwise specified, the aforementioned wordings do not have particular meanings, and thus cannot be understood as limiting the protection scope of the present disclosure.

In the description of the present disclosure, it is necessary to understand that, the azimuth or positional relations indicated by such azimuth terms as "front, rear, up, down, left, right", "transverse, vertical, perpendicular, horizontal" and "top, bottom", which are usually based on the azimuth or positional relations illustrated by the drawings, are only for facilitating description of the present disclosure and simplifying the description. Unless otherwise specified, such azimuth terms do not indicate or imply that the device or element referred to has to present a particular azimuth or to be constructed and operated in a particular azimuth, so that it cannot be understood as limiting the protection scope of the present disclosure. The azimuth terms "within" and "outside" mean the interior and exterior relative to the contour of various members themselves.

The lifting device provided by an embodiment of the present disclosure comprises a telescopic boom, a telescopic control mechanism, and a torque limiter.

The telescopic boom comprises a basic section A, at least one primary telescopic section telescopically disposed within the basic section A, and at least one secondary telescopic section telescopically disposed within the at least one primary telescopic section.

The telescopic control mechanism for manipulating telescoping of the telescopic boom is disposed within the telescopic boom. The telescopic control mechanism comprises a primary telescopic drive mechanism for manipulating synchronous telescoping of the at least one primary telescopic section and a secondary telescopic drive mechanism for manipulating synchronous telescoping of the at least one secondary telescopic section.

The torque limiter comprises a length measuring device. The length measuring device comprises a first length sensor 1 and a second length sensor 2. The first length sensor 1 comprises a first sensor body and a first length measuring cable that is telescopic relative to the first sensor body. The first sensor body as well as the telescopic end of the first length measuring cable are respectively connected to the tails of adjacent two sections in the basic section A and at least one primary telescopic section, so as to obtain a first length signal representative of an extension length of one primary telescopic section. The second length sensor 2 comprises a second sensor body and a second length measuring cable that is telescopic relative to the second sensor body. The second sensor body and a telescopic end of the second length measuring cable are respectively connected to tails of adjacent two sections in one primary telescopic section adjacent to the at least one secondary telescopic section and the at least one secondary telescopic section to obtain a second length signal representative of an extension length of one secondary telescopic section.

In the lifting device according to an embodiment of the present disclosure, the each of two length sensors only needs to respectively measure the extension length of one telescopic section relative to an adjacent section, so as to be able to obtain the total extension length of the telescopic sections in same level according to the obtained length signal and the structural parameters of the boom, to further obtain the total extension length of the telescopic boom. Compared with the prior art, the total length of the length measuring cable of one length sensor of the length measuring device is effectively shortened, so that it is possible to reduce the volume and weight of the corresponding length sensor.

In some embodiments, the first length measuring cable is provided inside the telescopic boom. The second length sensor is provided inside the telescopic boom. The configuration may effectively prevent damage to the length measuring cable by foreign objects, thereby improving the measurement reliability and service life of the length measuring device.

Figure 2:
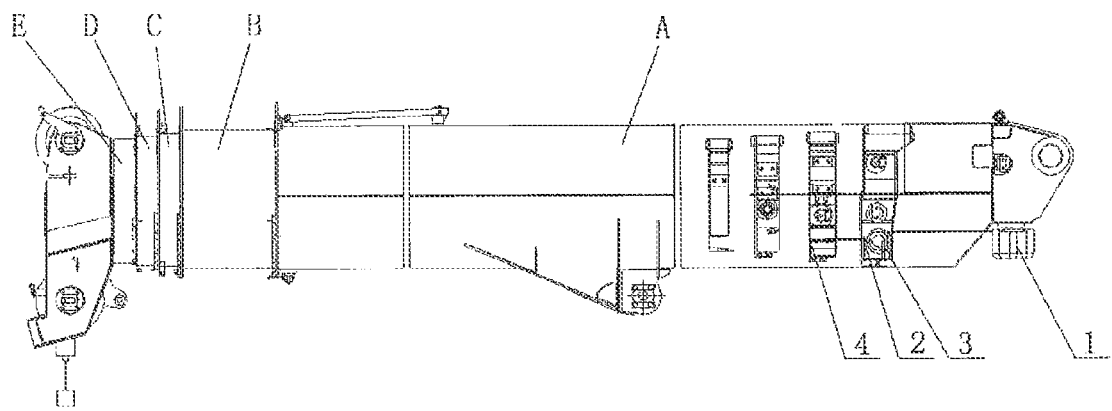
FIG. 2 is a schematic view of a local perspective structure of a telescopic boom of the lifting device as well as a length measuring device of the torque limiter according to an embodiment of the present disclosure.

As shown in FIG. 2, in some embodiments, the first sensor body is provided on the basic section A and located outside the basic section A, and a telescopic end of the first length measuring cable is passed through the basic section A and connected to a tail of a primary telescopic section (a second section B in the embodiments shown in FIGS. 2 and 3) adjacent to the basic section A. In some embodiments not shown, the first sensor body may also be disposed on the basic section A and located inside the basic section A, and a telescopic end of the first length measuring cable is connected to a tail of a primary telescopic section adjacent to the basic section A. The above position configuration of the first length sensor 1 facilitates the installation and maintenance of the first length sensor 1.

In some embodiments, the second length measuring cable is a steel wire rope. The second length measuring cable which is made of a steel wire rope facilitates reducing the volume of the second length sensor, thereby facilitating placing the second length sensor inside the boom without forming an interference with other structures inside the boom.

In some embodiments, the telescopic end of the first length measuring cable is connected to a signal output end of the second length sensor 2, for transferring the second length signal obtained by the second length sensor 2 to the first length sensor 1. The configuration allows that the first length measuring cable is used to generate the length measuring information of the first length sensor 1 and also used to transfer the second length signal obtained by the second length sensor 2, thereby saving the total length of the cables. Since there is no need to specially provide a length signal transmission cable for such distance from the second sensor body to the first sensor body, it is possible to reduce the space and weight occupied by the length measuring device, and facilitates the arrangement of the length measuring device inside the boom.

In some embodiments, the torque limiter further comprises a torque limiter main controller, and the length measuring device further comprises a length signal transmission cable. The length signal transmission cable is connected between the first length sensor 1 and the torque limiter main controller, for transmitting the first length signal obtained by the first length sensor 1 and the second length signal obtained by the second length sensor 2 to the torque limiter main controller. By transmitting the first length signal and the second length signal by using the same length signal transmission cable, it is possible to reduce the space and weight occupied by the length signal transmission cable of the length measuring device, and to facilitate the arrangement of the length measuring device inside the boom.

In some embodiments, the first sensor body and the second sensor body are respectively mounted at tails of adjacent sections. The configuration may reduce the total length of the length measuring cable or the length signal transmission cable of the first length sensor and the second length sensor as much as possible, thereby facilitating the reduction of the space and weight occupied by the length measuring device, and facilitating the arrangement of the length measuring device inside the boom.

In some embodiments, the lifting device comprises a first stay holder 3, by means of which the telescopic end of the first length measuring cable is detachably mounted at a tail of a corresponding section. In some embodiments, the lifting device comprises a second stay holder 4, by means of which the telescopic end of the second length measuring cable is detachably mounted at a tail of a corresponding section. Providing the stay holder facilitates positioning and assembling/disassembling the length measuring cable, thereby facilitating the installation and maintenance of the length measuring device.

In order to facilitate the installation and maintenance of the length measuring device, the telescopic boom comprises at least one opening, at least a part of constituent components of the length measuring device entering into or leaving from the boom through the at least one opening.

Figure 3:
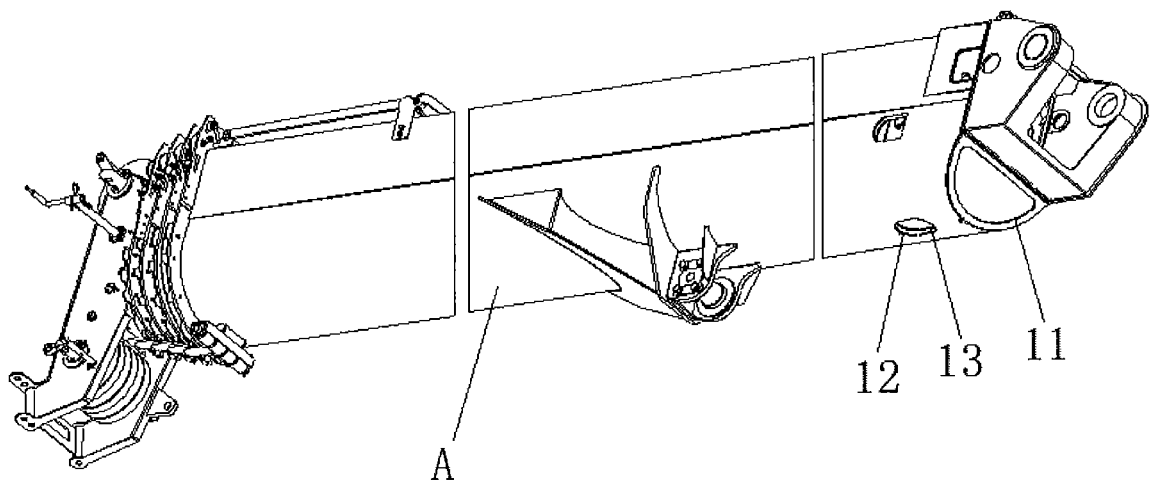
FIG. 3 is a schematic view of a perspective structure of the telescopic boom of the lifting device according to an embodiment shown in FIG. 2.

As shown in FIG. 3, the above-described at least one opening for example may comprise a first opening 11 disposed rearward of the basic section A. The inside condition of the boom may be observed through the first opening 11, and at least a part of constituent components of the length measuring device may be installed and maintained.

As shown in FIG. 3, the above-described at least one opening may further comprise a second opening 12 disposed lateral to the tail of the basic section A and a third opening 13 disposed lateral to the tail of a primary telescopic section (second section B in FIGS. 2 and 3) adjacent to the basic section A. The second opening 12 and the third opening 13 are present with an at least partially overlapped state in the telescoping process of the telescopic boom. The configuration may install and maintain at least a part of constituent components of the length measuring device through the second opening 12 and the third opening 13.

Hereinafter, the lifting device of the present disclosure will be described by taking as an example a double cylinder telescopic control mechanism of a rope arrangement type and a telescopic boom comprising five sections.

As shown in FIGS. 2 and 3, the telescopic boom of the lifting device of the present embodiment comprises five sections which are respectively a basic section A (i.e., first section), a second section B, a third section C, a fourth section D and a fifth section E (i.e., an terminal section of the telescopic boom). Wherein, at least one of the primary synchronous telescopic sections corresponds to the second section B. At least one of the secondary synchronous telescopic sections corresponds to the third section C, the fourth section D, and the fifth section E. At least one of the linkage sections corresponds to the fourth section D and the fifth section E.

The telescopic control mechanism according to an embodiment of the present disclosure is a double cylinder telescopic control mechanism of a rope arrangement type, which comprises a primary telescopic cylinder, a secondary telescopic cylinder, and a rope arrangement mechanism. The primary telescopic cylinder controls the telescoping of the second section B relative to the basic section A. The secondary telescopic cylinder controls the telescoping of the third section C relative to the second section B. The rope arrangement mechanism is in linkage with the secondary telescopic cylinder, to control the synchronous telescoping of the fourth section D and the fifth section E with the third section C.

Figure 4:
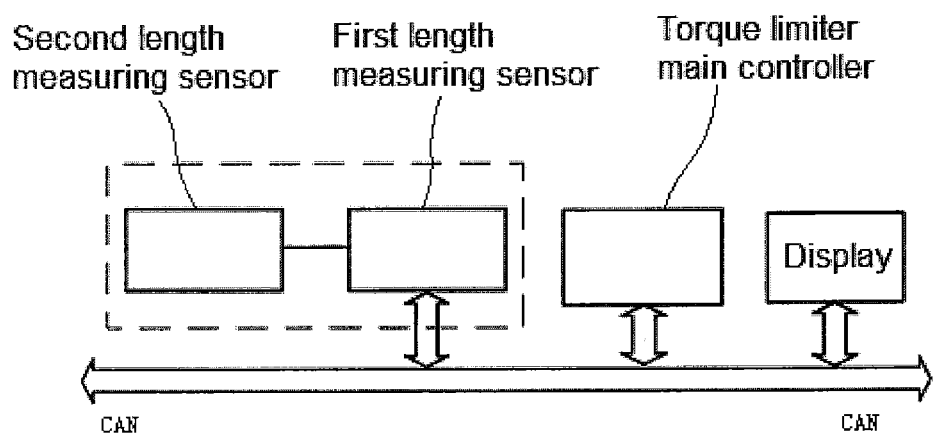
FIG. 4 is a structural block diagram of a torque limiter of the lifting device according to an embodiment of the present disclosure.

As shown in FIG. 4, the torque limiter according to an embodiment of the present disclosure comprises a length measuring device, a torque limiter main controller, a display, and a CAN (Controller Area Network) bus connected to the length signal transmission cable and the like.

The length measuring device mainly comprises a first length sensor 1, a second length sensor 2, a first stay holder 3, a second stay holder 4 and a length signal transmission cable.

As shown in FIG. 2, the first sensor body of the first length sensor 1 is mounted outside the basic section A and below the tail of basic section A, wherein the bottom of the tail is recessed upwards relative to a barrel of the basic section A, to facilitate preventing the impact of foreign objects on the first sensor body. The second sensor body of the second length sensor 2 is mounted at the bottom of the tail of the second section B. As shown in FIG. 2, two stay holders are arranged at the tail of the second section B and the tail of the third section C respectively. The first stay holder 3 is fixed to the tail of the second section B; the second stay holder 4 is fixed to the tail of the third section C. The telescopic end of the first length measuring cable of the first length sensor 1 is detachably mounted to the tail of the second section B through the first stay holder 3. The telescopic end of the second length measuring cable of the second length sensor 2 is detachably mounted to the tail of the third section B through the second stay holder 4.

The first length sensor 1 and the second length sensor 2 may select length sensors in the prior art. The length sensor has a length measuring cable and a measuring member for measuring a tensile length of the length measuring cable. For example, in some length sensors, the measuring member may be an angle sensor. The tensile length of the length measuring cable is calculated by measuring a rotation angle of a spool arising from the stretching of the length measuring cable, thereby obtaining an extension length of the corresponding section.

In the present embodiment, the first length measuring cable is a communication cable connected to the signal output end of the second sensor body. That is, the first length measuring cable is used to generate the length measuring information of the first length sensor 1, and also used to transmit a second length signal obtained by the second length sensor 2. The first length sensor 1 is connected to the torque limiter main controller through the length signal transmission cable of the length measuring device so as to transfer the first length signal obtained by the first length sensor 1 and the second length signal obtained by second length sensor 2 to the torque limiter main controller.

Since the third section C, the fourth section D and the fifth section E are located inside the telescopic boom, in order to avoid the interference, the second length measuring cable is made of a steel wire rope. The steel wire rope has a high strength, so that it may be made thin, and advantageous for reducing the size of the reel of the second sensor body, thereby reducing the volume of the second sensor body, and the arrangement of the second length sensor 2 inside the boom is also favorable for avoiding interfere with other members.

As shown in FIG. 3, in the present embodiment, a plurality of openings for the access of at least a part of constituent components of the length measuring device are provided in the vicinity of some positions of the telescopic boom, the length sensor and the stay holder being located at the positions. In the present embodiment, the plurality of openings comprise a first opening 11 disposed at a lower portion of the rear side of the basic section A, a second opening 12 disposed at a lower portion of a lateral of the tail of the basic section A, and a third opening 13 disposed at a lower portion of a lateral of the tail of the second section B. When the telescopic boom is in a fully retracted state, the second opening 12 overlaps with the third opening 13. The internal condition of the telescopic boom may be observed through the first opening 11, to facilitate hitching the telescopic end of the first length measuring cable onto the first stay holder 3 through a shackle or a relevant standard member, and facilitate assembling/disassembling and replacing the second length sensor 2 and the first stay holder 3 and facilitate the connection of the telescopic end of the first length measuring cable with the signal output end of the second length sensor 2. The second opening 12 and the third opening 13 facilitate hitching the telescopic end of the second length measuring cable onto the second stay holder 4 through the shackle or a relevant standard member.

The operation principles of the telescopic boom according to an embodiment of the present disclosure are explained as follows.

The first length sensor 1 detects the stroke of the primary telescopic cylinder, i.e., detecting an extension length of the second section B relative to the basic section A to form a first length signal. The second length sensor 2 detects the stroke of the secondary telescopic cylinder, i.e., detecting an extension length of the third section C relative to the second section B to form a second length signal. Since the secondary telescopic cylinder drives the third section C, the fourth section D and the fifth section E to telescope synchronously, according to the second length signal and in combination with the structural parameters of the telescopic boom, the total extension length of the third section C, the fourth section D and the fifth section E may be obtained or the relevant information by calculation. By integrating the length signals of the two length sensors, it is also possible to obtain the total extension length of the telescopic boom or the relevant information.

The second length signal obtained by the second length sensor 2 is transferred to the first length sensor 1 through the first length measuring cable, and the first length sensor 1 transfers the obtained first length signal and the received second length signal to the torque limiter main controller via the length signal transmission cable and the CAN bus. The torque limiter main controller calculates the extension ratio of the second section B as well as the extension ratios of the third section C, the fourth section D and the fifth section E according to the transferred first length signal and second length signal and in combination with the structural parameters of the telescopic boom. The telescopic state in which the boom is situated is determined by comparison running an internal program. At the same time, the torque limiter main controller calculates the total extension length of the boom and displays the same on the display.

The performance curve may be automatically matched according to the extension ratio of the second section B and the total extension length of the boom combined with the telescopic state of the boom. For example, the performance curves when the extension ratio of the second section B is 0%, 25%, 50%, 75% or 100% may be stored in the torque limiter main controller. When it is detected that the extension ratio of the second section B is near 50% and greater than 50%, the performance curve when the extension ratio is 50% may be automatically matched, or the rated load is calculated by an interpolation method, to choose a performance curve of a proper operational condition.

The torque limiter main controller may be a general purpose processor, a programmable logic controller (referred to as PLC for short), a digital signal processor (referred to as DSP for short), an application specific integrated circuit (referred to as ASIC for short), a field-programmable gate array (referred to as FPGA for short) or other programmable logic devices, discrete gates or transistor logic devices, discrete hardware assemblies or any proper combination thereof.

The lifting device of the present disclosure comprises, but is not limited to automobile cranes, tire cranes, railway track cranes, crawler cranes, and the like.

According to the above descriptions, it can be known that the above embodiments of the present disclosure have at least one of the following technical effects:

Effectively reducing the length of the length measuring cable, shortening the volume of the length sensor, and providing support for a built-in length measuring device.

The length measuring device is at least partially built-in, which facilitates avoiding damage to the length measuring cable by foreign objects, and facilitates ensuring the reliability of the lifting device during the transfer and operation.

The boom is provided with openings for facilitating the installation and maintenance of the length measuring device.

Finally, it should be explained that: the aforementioned embodiments are only used to describe the technical solution of the present disclosure rather than limiting the same; although detailed explanations are made to the present disclosure by referring to preferred embodiments, a common technical person in the art should understand that: it is still possible to make amendments to the embodiments of the present disclosure or make equivalent replacements to part of the technical features; without departing from the present disclosure, they should all be covered in the scope of the technical solution for which protection is sought in the present disclosure.

The invention claimed is:

1. A lifting device, comprising:
a telescopic boom, comprising a basic section, at least one primary telescopic section telescopically disposed within the basic section, and at least one secondary telescopic section telescopically disposed within the at least one primary telescopic section;
a telescopic control mechanism for manipulating telescoping of the telescopic boom, disposed within the telescopic boom, and comprising a primary telescopic drive mechanism for manipulating synchronous telescoping of the at least one primary telescopic section and a secondary telescopic drive mechanism for manipulating synchronous telescoping of the at least one secondary telescopic section; and
a torque limiter, comprising a length measuring device, the length measuring device comprising a first length sensor and a second length sensor;
wherein the first length sensor comprises a first sensor body and a first length measuring cable telescopic relative to the first sensor body, wherein the first sensor body and a telescopic end of the first length measuring cable are respectively connected to tails of adjacent two sections in the basic section and the at least one primary telescopic section to obtain a first length signal representative of an extension length of one primary telescopic section;
wherein the second length sensor comprises a second sensor body and a second length measuring cable telescopic relative to the second sensor body, wherein the second sensor body and a telescopic end of the second length measuring cable are respectively connected to tails of adjacent two sections in one primary telescopic section adjacent to the at least one secondary telescopic section and the at least one secondary telescopic section to obtain a second length signal representative of an extension length of one secondary telescopic section.

2. The lifting device according to claim 1, wherein
the first length measuring cable is provided inside the telescopic boom; and/or,
the second length sensor is provided inside the telescopic boom.

3. The lifting device according to claim 2, wherein
the first sensor body is provided on the basic section and located outside the basic section, and the telescopic end of the first length measuring cable is passed through the basic section and connected to a tail of a primary telescopic section adjacent to the basic section; or,
the first sensor body is provided on the basic section and located inside the basic section, and the telescopic end of the first length measuring cable is connected to a tail of a primary telescopic section adjacent to the basic section.

4. The lifting device according to claim 3, wherein the first sensor body is disposed outside the basic section and below a tail of the basic section, wherein a bottom of the tail of the basic section is recessed upwards relative to a barrel of the basic section.

5. The lifting device according to claim 1, wherein the second length measuring cable is a steel wire rope.

6. The lifting device according to claim 1, wherein the telescopic end of the first length measuring cable is connected to a signal output end of the second length sensor, for transferring the second length signal obtained by the second length sensor to the first length sensor.

7. The lifting device according to claim 6, wherein
the torque limiter further comprises a torque limiter main controller;
the length measuring device comprises a length signal transmission cable connected between the first length sensor and the torque limiter main controller, for transferring the first length signal and the second length signal to the torque limiter main controller.

8. The lifting device according to claim 1, wherein the first sensor body and the second sensor body are respectively mounted at tails of adjacent sections.

9. The lifting device according to claim 1, wherein
the at least one primary telescopic section comprises a second section, wherein the primary telescopic drive mechanism is configured to manipulate telescoping of the second section relative to the basic section, and the first sensor body and the telescopic end of the first length measuring cable are respectively connected to the tail of the basic section and the tail of the second section;
the at least one secondary telescopic section comprises a third section, wherein the secondary telescopic drive mechanism is configured to manipulate telescoping of the third section relative to the second section, and the second sensor body and the telescopic end of the second length measuring cable are respectively connected to the tail of the second section and the tail of the third section.

10. The lifting device according to claim 9, wherein
the primary telescopic drive mechanism comprises a primary telescopic cylinder that manipulates telescoping of the second section relative to the basic section, and the secondary telescopic drive mechanism comprises a secondary telescopic cylinder that manipulates telescoping of the third section relative to the second section and a rope arrangement mechanism in linkage with the secondary telescopic cylinder;
the at least one secondary telescopic section further comprises at least one linkage section telescopically disposed within the third section, wherein the rope arrangement mechanism manipulating synchronous telescoping of the at least one linkage arm relative to the third section.

11. The lifting device according to claim 1, comprising:
a first stay holder, the telescopic end of the first length measuring cable being detachably mounted at a tail of a corresponding section by means of the first stay holder; and/or
a second stay holder, the telescopic end of the second length measuring cable being detachably mounted at a tail of a corresponding section by means of the second stay holder.

12. The lifting device according to claim 1, wherein the telescopic boom has at least one opening, at least a part of constituent components of the length measuring device entering into or leaving from the boom through the at least one opening.

13. The lifting device according to claim 12, wherein the at least one opening comprises a first opening disposed rearward of the basic section.

14. The lifting device according to claim 12, wherein the at least one opening comprises:
- a second opening disposed lateral to the tail of the basic section; and
- a third opening disposed lateral to the tail of the primary telescopic section adjacent to the basic section, wherein the second opening and the third opening are configured to at least partially overlap in a telescopic process of the telescopic boom.

\* \* \* \* \*